United States Patent
DeCapua et al.

(10) Patent No.: US 7,654,403 B2
(45) Date of Patent: Feb. 2, 2010

(54) FUEL TANK VACUUM-RELIEF SYSTEM

(75) Inventors: Dennis M. DeCapua, Greenfield, IN (US); Douglas O. Gregory, Centerville, IN (US)

(73) Assignee: Stant Manufacturing Inc., Connerville, IN (US)

(*) Notice: Subject to any disclaimer, the term of this patent is extended or adjusted under 35 U.S.C. 154(b) by 870 days.

(21) Appl. No.: 11/219,549

(22) Filed: Sep. 2, 2005

(65) Prior Publication Data
US 2007/0051724 A1  Mar. 8, 2007

(51) Int. Cl.
*B65D 51/16* (2006.01)
*B65D 47/00* (2006.01)

(52) U.S. Cl. ............ 220/203.23; 220/86.2; 220/203.24; 220/203.28; 220/288

(58) Field of Classification Search ............ 220/203.23, 220/203.24, 203.25, 203.28, 86.1, 86.2
See application file for complete search history.

(56) References Cited

U.S. PATENT DOCUMENTS

| | | |
|---|---|---|
| 3,937,358 A | 2/1976 | Smith et al. |
| 4,498,493 A | 2/1985 | Harris |
| 4,540,103 A * | 9/1985 | Kasugai et al. ......... 220/203.23 |
| 4,676,390 A | 6/1987 | Harris |
| 4,716,920 A | 1/1988 | Crute |
| 4,785,961 A * | 11/1988 | Kasugai et al. ......... 220/203.25 |
| 5,108,001 A | 4/1992 | Harris |
| 6,260,726 B1 * | 7/2001 | Muth et al. ............ 220/203.24 |
| 2004/0000554 A1 * | 1/2004 | Griffin et al. ................. 220/304 |

FOREIGN PATENT DOCUMENTS

GB 199541 6/1923

OTHER PUBLICATIONS

Partial European Search Report issued in EP06254450.

* cited by examiner

*Primary Examiner*—Anthony Stashick
*Assistant Examiner*—Niki M Eloshway
(74) *Attorney, Agent, or Firm*—Barnes & Thornburg LLP

(57) ABSTRACT

A filler neck cap includes a vacuum-relief valve member that moves from a normally closed position to an opened position when exposed to certain vacuum conditions to open a vent aperture and allow atmosphere to flow therethrough. The filler neck cap also includes a pressure-relief valve member formed to include the vent aperture that is closed normally by the vacuum-relief valve member.

26 Claims, 6 Drawing Sheets

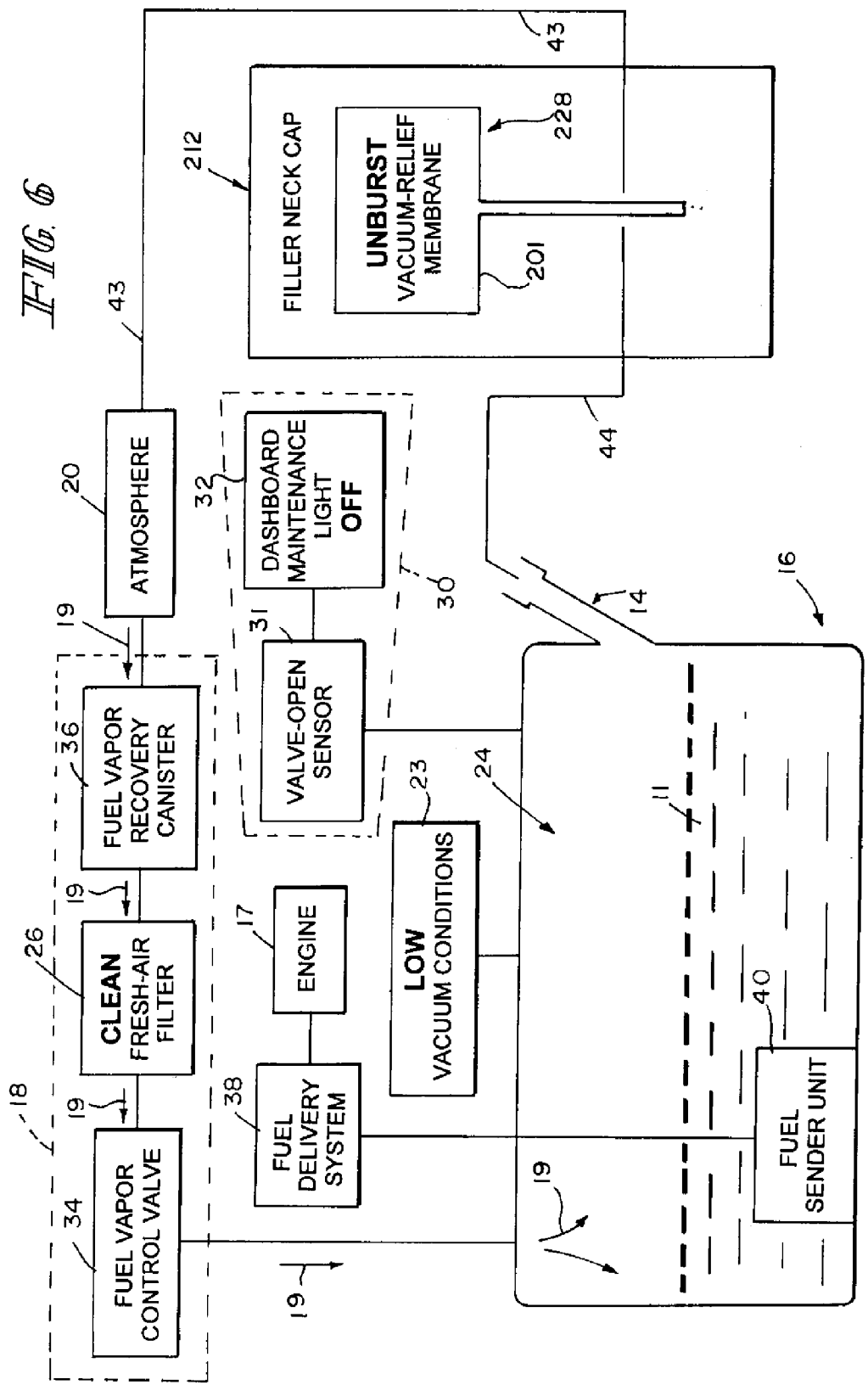

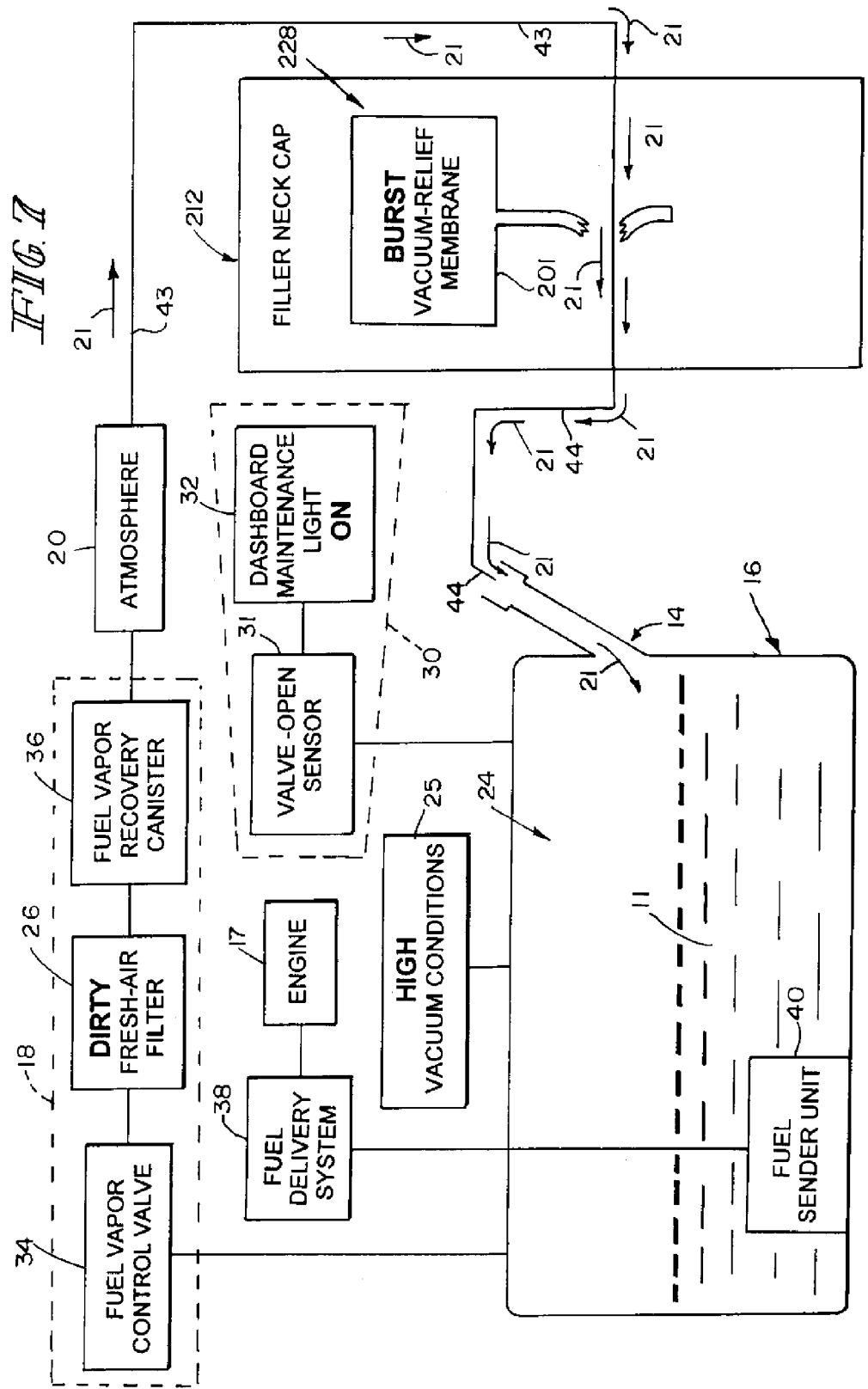

FUEL TANK VACUUM-RELIEF SYSTEM

BACKGROUND

The present disclosure relates to a vehicle fuel system, and particularly to a filler neck cap adapted to close a fuel tank filler neck. More particularly, the present disclosure relates to a filler neck cap having a vacuum-relief valve.

It is desirable to control pressure in a vehicle fuel tank. Whenever the pressure within the tank reaches a predetermined superatmospheric level, a vent passage is opened automatically to vent pressurized fuel vapor from the tank to limit excess pressure buildup. Whenever pressure within the tank drops to a predetermined subatmospheric level, a vent passage is opened to the atmosphere to equalize pressure in the tank with the atmosphere.

SUMMARY

In accordance with the present disclosure, a normally closed vacuum-relief regulator in a filler neck cap moves to an opened position to admit make-up air from the atmosphere into a fuel tank associated with the filler neck cap. In illustrative embodiments, a retainer coupled to the vacuum-relief regulator retains the vacuum-relief regulator in the opened position to trigger a warning signal that a fresh-air filter included in a tank vent system associated with the fuel tank is clogged with dirt or other contaminant material and should be replaced with a clean fresh-air filter.

Additional features of the disclosure will become apparent to those skilled in the art upon consideration of the following detailed description of illustrative embodiments exemplifying the best mode of carrying out the disclosure as presently perceived.

BRIEF DESCRIPTION OF THE DRAWINGS

The detailed description particularly refers to the accompanying figures in which:

FIG. 6 is a diagrammatic view of a vehicle fuel system similar to FIG. 1 but showing a filler neck cap in accordance with a second embodiment of the present disclosure and showing that the dashboard maintenance light is OFF when low-vacuum conditions are present in the fuel tank (since, for example, a fresh-air filter associated with the fuel tank is CLEAN) and a vacuum-relief membrane included in the filler neck cap is UNBURST; and FIG. 7 is a diagrammatic view similar to FIG. 6 showing that the dashboard maintenance light is ON when HIGH-vacuum conditions are present in the fuel tank (since, for example, a fresh-air filter associated with the fuel tank is DIRTY) and the vacuum-relief membrane included in the filler neck cap has BURST to allow atmospheric air to flow through an opening formed in the BURST vacuum-relief membrane into the fuel tank to relieve excess (high) vacuum conditions in the fuel tank.

DETAILED DESCRIPTION

Figure 1:
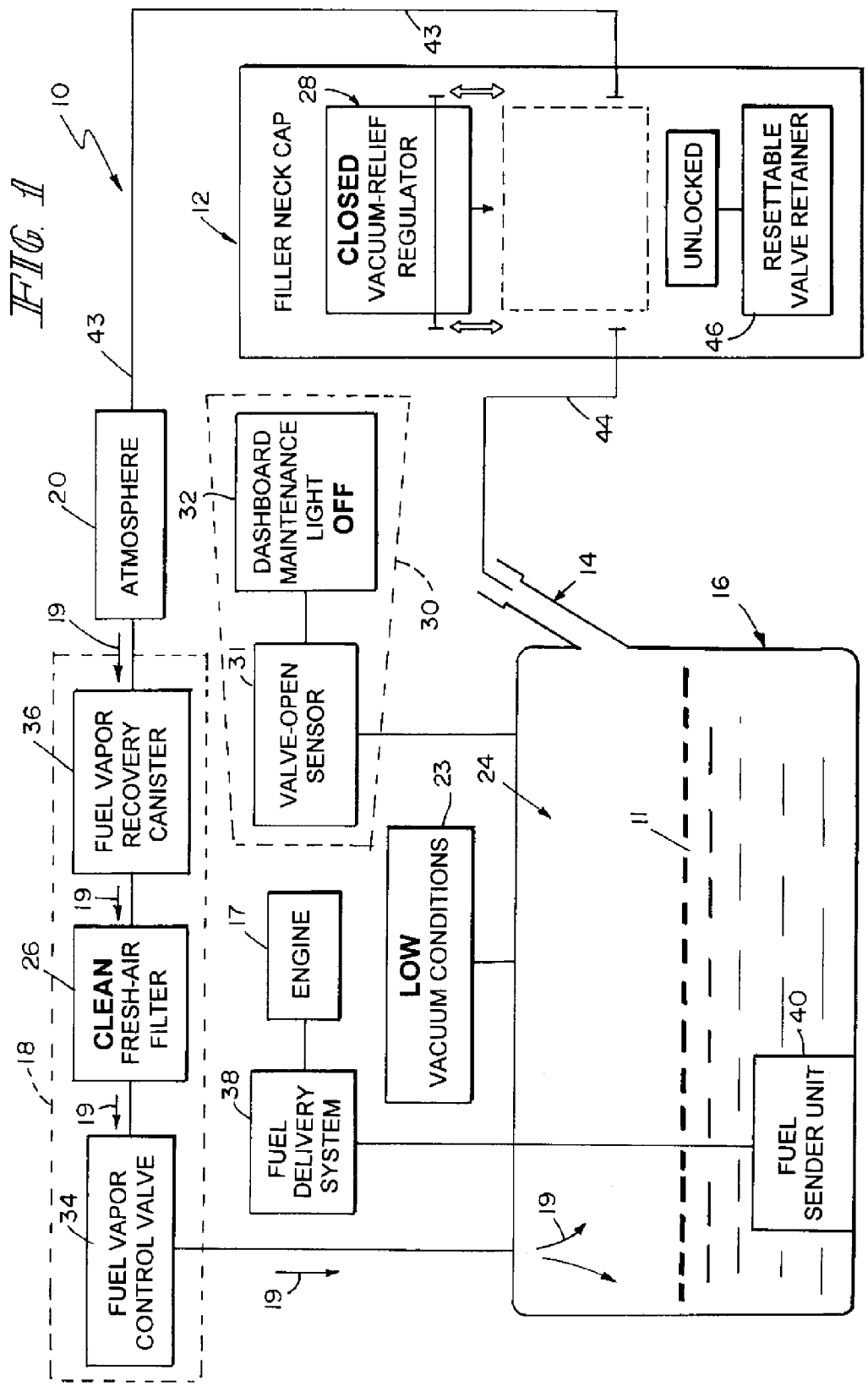
FIG. 1 is a diagrammatic view of a vehicle fuel system showing (1) a filler neck cap adapted to close an open mouth of a fuel tank filler neck, (2) a vehicle drive system comprising an engine, a fuel-delivery system, and a fuel-sender unit located in the fuel tank, (3) a tank vent system comprising a fuel vapor control valve coupled to the fuel tank, a fresh-air filter, and a fuel vapor recovery canister, and (4) a "dirty" filter warning system comprising a valve-open sensor and a dashboard maintenance light, and also showing that the dashboard maintenance light is OFF when the fresh-air filter is CLEAN because a vacuum-relief regulator in the filler neck cap is CLOSED when LOW-vacuum conditions are present in the fuel tank.

A vehicle fuel system 10 in accordance with the present disclosure comprises a filler neck cap 12 adapted to close a filler neck 14 coupled to a fuel tank 16 associated with an engine 17. A tank vent system 18 is used normally to admit make-up air 19 from atmosphere 20 into fuel tank 16 through fuel vapor control valve 34 to relieve any unwanted vacuum condition 23 in vapor space 24 of fuel tank 16 as shown diagrammatically in FIG. 1. If tank vent system 18 is disabled or impaired due, for example, to a "dirty" fresh-air filter 26 included in system 18, then a vacuum-relief regulator 28 included in filler neck cap 12 moves from a normally closed position shown diagrammatically in FIG. 1 to an opened position shown diagrammatically in FIG. 2 to admit make-up air 21 from atmosphere 20 into fuel tank vapor space 24 through filler neck 14 to relieve any unwanted vacuum in vapor space 24 of fuel tank 16 that persists as a result of the inability of tank vent system 18 to relieve that tank vacuum.

In accordance with the present disclosure, vacuum-relief regulator 28 is retained in the opened position even after the fuel tank vacuum has dissipated and there is no need to provide any make-up air 19 or 21 to fuel tank vapor space 24. A leak-detection system 30 associated with fuel tank 16 will sense the open air path through filler neck cap 12 created by the opened vacuum-relief regulator 28 when, for example, vehicle fuel system 10 operates to conduct a "gross leak test" at the next startup of engine 17 and activate a dashboard maintenance indicator 32 included in leak-detection system 30 to provide a visual, audible, or noticeable signal. Such a signal will alert a vehicle operator or service technician to check vacuum-relief regulator 28 in filler neck cap 12 for reset or replacement and also to check fresh-air filter 26 for excessive dirt and replacement to cure any make-up air 19 delivery problems suffered by tank vent system 18. It is within the scope of this disclosure to operate leak-detection 30 to sense an opened vacuum-relief regulator at any suitable time.

In illustrative embodiments shown in FIGS. 1-4, vacuum-relief regulators 28, 128 can be "reset" manually from its opened position to its normally closed position by a service technician once fresh-air filter 26 has been cleaned or replaced. Another embodiment is shown diagrammatically in FIGS. 6 and 7. In this embodiment, vacuum-relief regulator 228 includes an unburst vacuum-relief membrane 201 that, when intact, establishes the normally closed position of vacuum-relief regulator 228 as shown in FIG. 6. When exposed to sufficient tank vacuum, vacuum-relief membrane 201 bursts as shown diagrammatically in FIG. 7 to establish the opened position of vacuum-relief regulator 228. In this embodiment, a new vacuum-relief regulator 228 provided with an unburst vacuum-relief membrane 201 must be installed in filler neck cap 12 by a service technician to re-establish the closed position of vacuum-relief regulator 228.

As suggested in FIG. 1, tank vent system 18 comprises a fuel vapor control valve 34 coupled to fuel tank 16 to communicate with fuel tank vapor space 24 and a fuel vapor-recovery canister 36 opened to atmosphere 20. A fresh-air filter 26 included in tank vent system 18 is interposed between fuel vapor control valve 34 and fuel vapor-recovery canister 36. Fresh-air filter 26 is arranged and configured to provide means for filtering dirt and other contaminant material from make-up air 19 drawn from atmosphere 20 into fuel tank vapor space 24 through fuel vapor-recovery canister 36 and fuel vapor control valve 34 to relieve any unwanted vacuum condition 23 extant in fuel tank vapor space 24. Should fresh-air filter 26 become dirty or occluded with contaminant material, the flow of make-up air 19 through tank vent system 18 into vapor space 24 could be slowed or stopped resulting in a failure to provide adequate make-up air 19 to vapor space 24 and thus a continuation of unwanted vacuum condition 23 in fuel tank vapor space 24. It is within the scope of this disclosure to locate fresh-air filter 26 in fuel tank 16, fuel vapor control valve 34, fuel vapor-recovery canister 36, or other suitable locations to filter make-up air 19 delivered to fuel tank vapor space 24.

As also suggested in FIG. 1, a fuel-delivery system 38 provides means for delivering liquid fuel 11 from a fuel sender unit 40 provided in fuel tank 16 to engine 17 for combustion in engine 17. It is desirable to keep dirt and other debris out of fuel tank 16 and away from liquid fuel 11 extant in fuel tank 16 to minimize the risk that dirt and other debris could be delivered to engine 17 by fuel-delivery system 38.

A leak-detection system 30 is associated with fuel tank 16 as shown diagrammatically in FIG. 1. Leak-detection system 30 comprises a valve-open sensor 31 arranged and configured to provide means for sensing fuel vapor leaks in fuel tank 16, filler neck 14, and other fuel vapor flow conduits and components associated with fuel tank 16. In illustrative embodiments, valve-open sensor 31 is arranged and configured to sense an open air path through filler neck cap 12 created by the opened vacuum-relief regulator 28 and then to activate dashboard maintenance light 32 (or other suitable indicator) at, for example, the next startup of engine 17. Thus, a lit dashboard maintenance light 32 provides a signal to alert a vehicle operator or service technician to inspect for dirt and, if necessary, replace fresh-air filter 26 and then to reset or replace vacuum-relief regulator 28.

Vacuum-relief regulator 28 is shown diagrammatically in FIG. 1 to occupy its normally closed position in filler neck cap 12. Flow of air from atmosphere 20 to filler neck 14 (and fuel tank vapor space 24) through first and second air conduits 43, 44 provided in filler neck cap 12 is blocked because vacuum-relief regulator 28 is moved to assume the normally closed position to block air in first air conduit 43 opened to atmosphere 20 from flowing into second air conduit 44 to reach filler neck 14. In the illustrated embodiment, a resettable valve retainer 46 associated with vacuum-relief regulator 28 is "unlocked" and thus is inactive as long as vacuum-relief regulator 28 remains in the normally closed position shown, for example, in FIG. 1.

Figure 2:
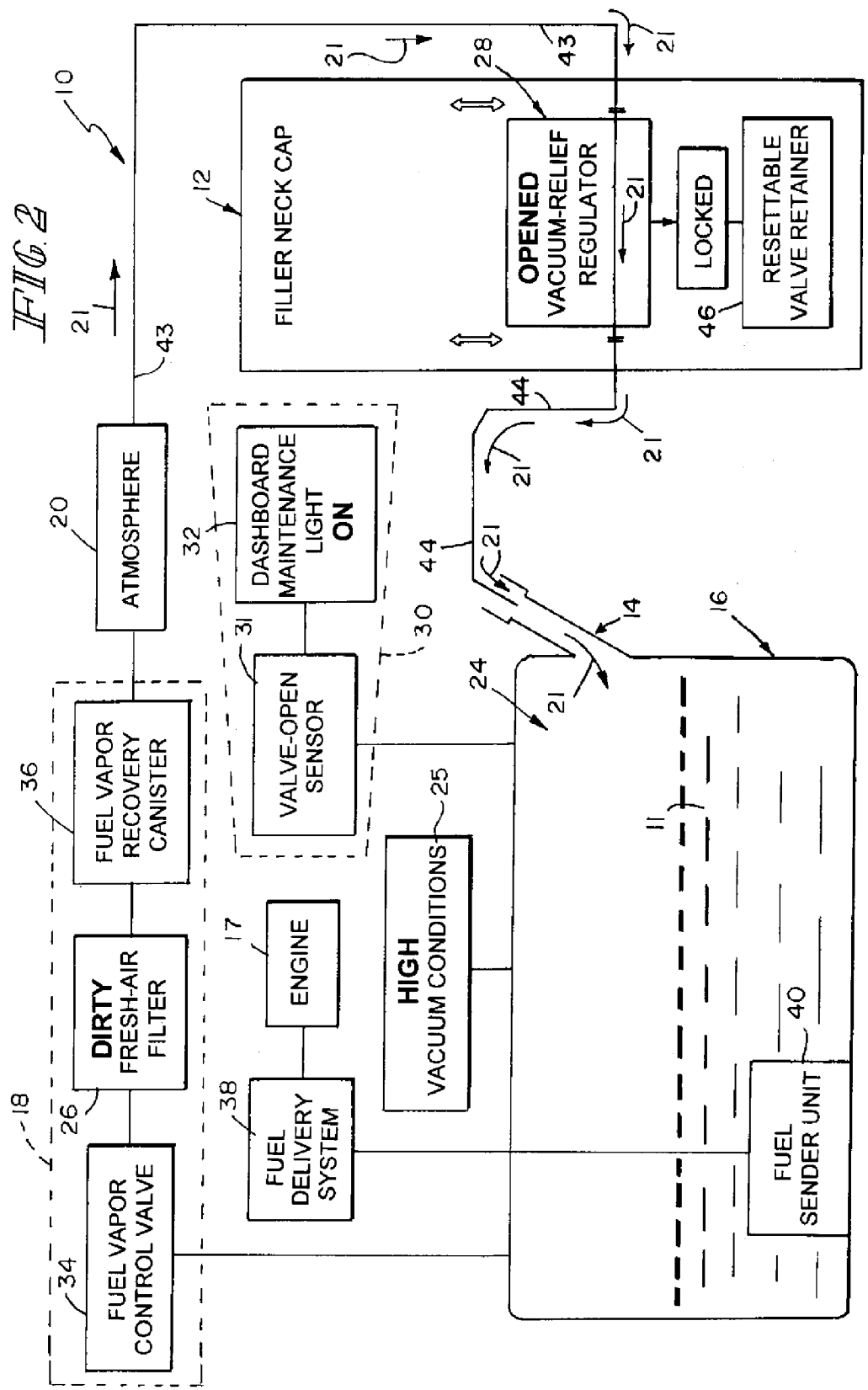
FIG. 2 is a view similar to FIG. 1 showing that the dashboard maintenance light is ON when the fresh-air filter is DIRTY because the vacuum-relief regulator in the filler neck cap is now OPENED when HIGH-vacuum conditions are present in the fuel tank as a result of, for example, the DIRTY fresh-air filter.

Movement of vacuum-relief regulator 28 to an opened position in filler neck cap 12 is shown diagrammatically in FIG. 2. Make-up air 21 flows from atmosphere 20 to filler neck 14 (and fuel tank vapor space 24) through first and second air conduits 43, 44 provided in filler neck cap 12 because vacuum-relief regulator 28 is moved to assume the opened position. In the illustrated embodiment, resettable valve retainer 46 is "locked" and thus provides means for retaining vacuum-relief regulator 28 in the opened position so that make-up air 21 (and fuel vapor) can continue to flow through first and second air conduits 43, 44 into filler neck 14 even after pressure extant in filler neck 14 (and fuel tank vapor space 24) rises above a predetermined subatmospheric (vacuum) level. This continued air flow is interpreted by valve-open sensor 31 to be a "leak" causing activation of dashboard maintenance light 32. Vehicle operators and service technicians seeing activated light 32 will have been taught in accordance with the present disclosure to inspect fresh-air filter 26 for dirt and contamination and to replace a dirty fresh-air filter 26 with a clean filter. Although pinched or plugged lines are a possibility, the most likely cause of activated light 32 is a dirty fresh-air filter 26. Next, the operator or technician will use resettable valve retainer 46 in accordance with the present disclosure to "release" vacuum-relief regulator 28 from its "locked/retained" state depicted in FIG. 2 so that vacuum-relief regulator 28 moves (or is moved) to assume the unlocked normally closed position depicted in FIG. 1.

Figure 3:
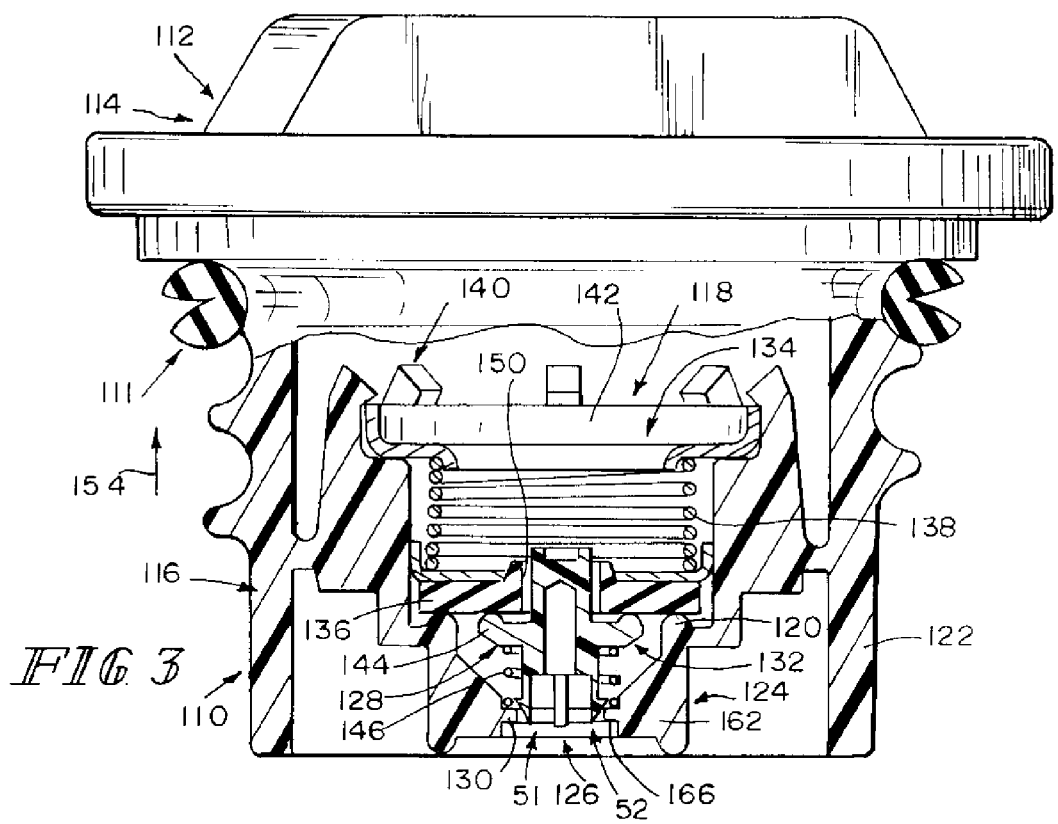
FIG. 3 is a side elevation view of a filler neck cap in accordance with a first embodiment of the present disclosure, with portions broken away, showing a CLOSED vacuum-relief regulator of the type shown diagrammatically in FIG. 1.
Figure 4:
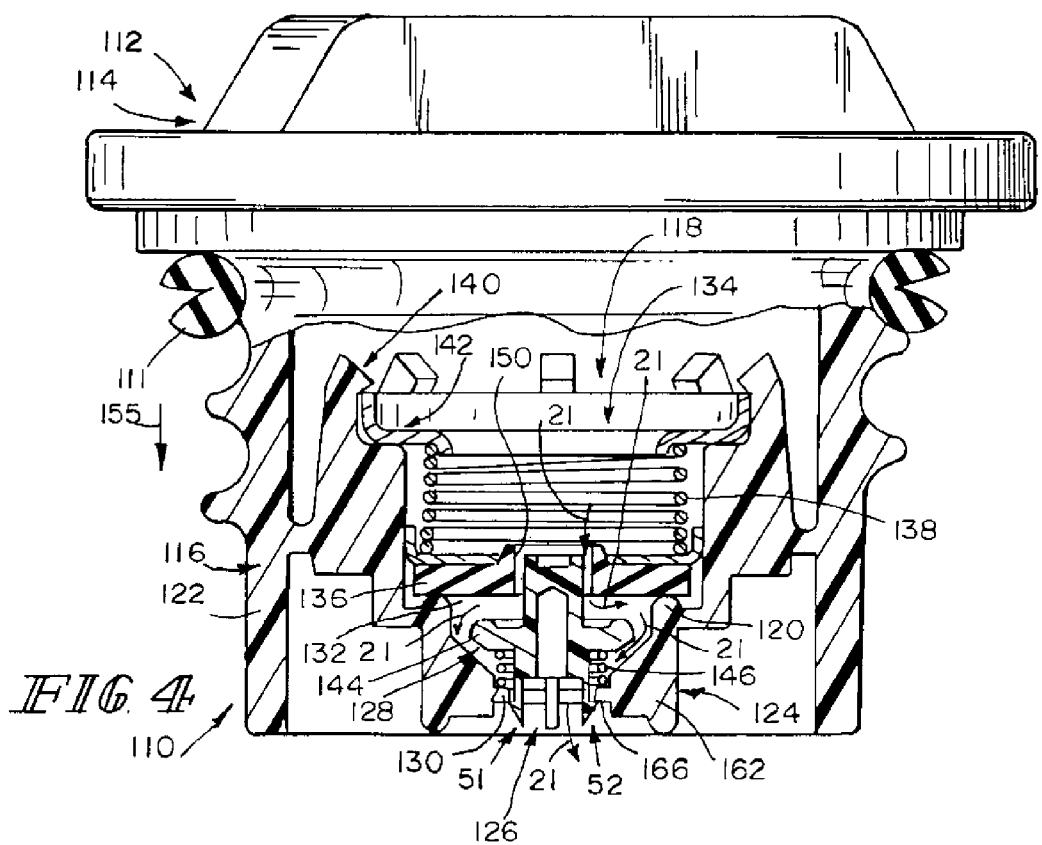
FIG. 4 is a side elevation view similar to FIG. 3 showing an OPENED vacuum-relief regulator of the type shown diagrammatically in FIG. 2 and showing that three latches coupled to the vacuum-relief regulator cooperate to retain the vacuum-relief regulator in the opened position.
Figure 5:
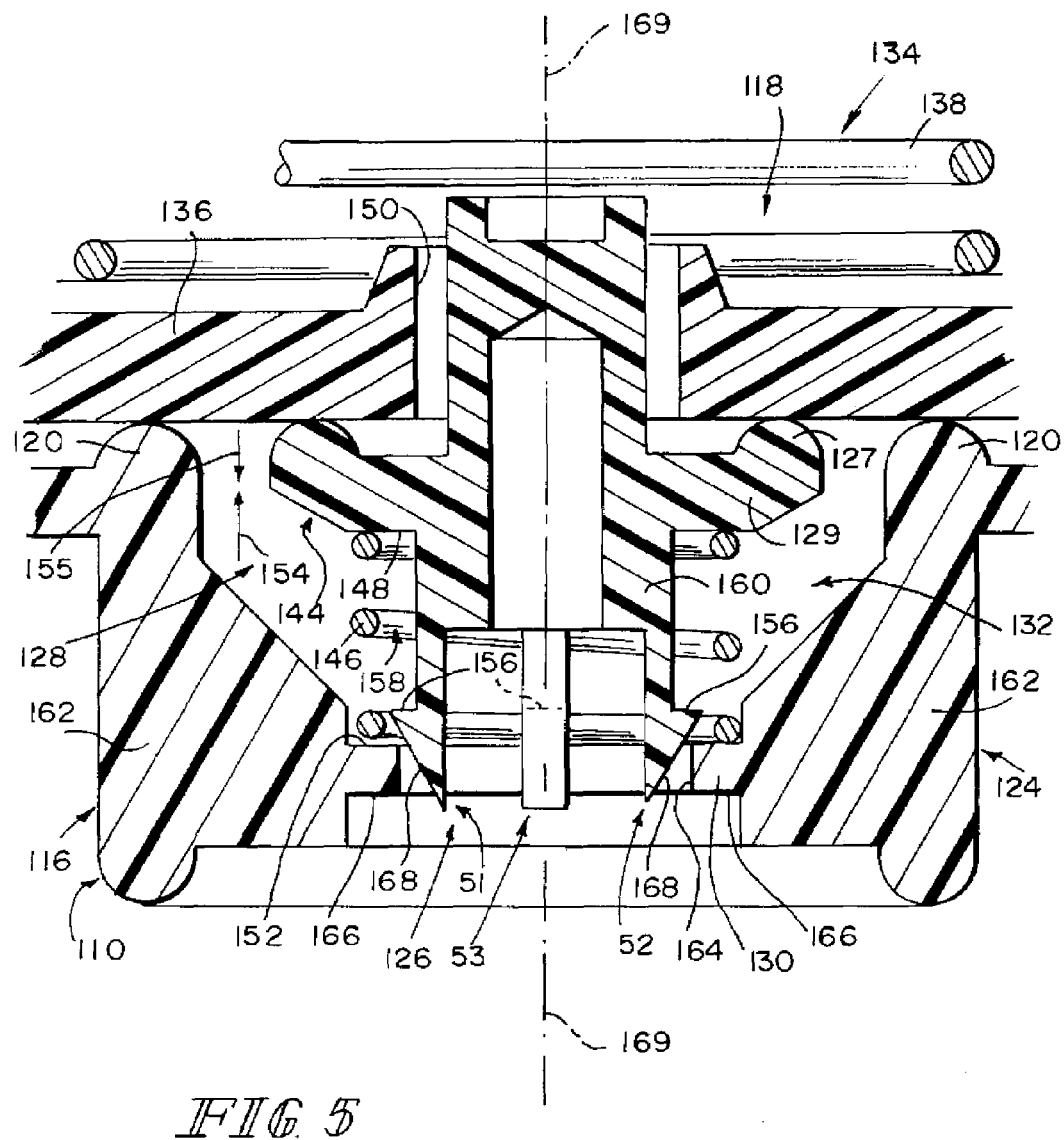
FIG. 5 is an enlarged view of a portion of a valve housing included in the filler neck cap of FIGS. 3 and 4 showing a coiled compression spring urging a vacuum-relief valve member upwardly to a position closing a vent aperture formed in a pressure-relief regulator to illustrate an embodiment of the vacuum-relief regulator in the closed position and showing three "retention" latches arranged to extend downwardly from a base of the vacuum-relief valve member in close proximity to an annular anchor flange provided in the valve housing and poised to mate with the annular anchor flange (as shown in FIG. 4) to retain the vacuum-relief regulator in the opened position.

An illustrative embodiment of a filler neck cap 112 comprising a vacuum-relief regulator 128 is shown in FIGS. 3-5. Vacuum-relief regulator 128 is shown in its normally closed position in FIG. 3 and retained in an opened position to open a vent aperture 150 provided in filler neck cap 112 as shown in FIG. 4 by a resettable valve retainer 126 comprising, for example, first, second, and third latches 51, 52, 53 coupled to vacuum-relief regulator 128 to move therewith. It is within the scope of this disclosure to use only one of latches 51, 52, 53 in resettable valve retainer 126. An enlarged view of vacuum-relief regulator 128 and resettable valve retainer 126 is provided in FIG. 5 showing vacuum-relief regulator 128 in the normally closed position.

As shown in FIG. 3, filler neck cap 112 comprises a closure 110, an O-ring seal 111 coupled to closure 110, and a cover 114 coupled to closure 110. Closure 110 is adapted to mate with and close fuel tank filler neck 14. Cover 114 is arranged to overlie closure 110 and is adapted to be gripped and moved by a user to remove closure 110 from filler neck 14.

Closure 110 includes a valve housing 116 formed to include an interior region 118 containing vacuum-relief regulator 128 and an annular valve seat 120 as shown, for example, in FIG. 3. In an illustrative embodiment shown in FIGS. 3-5, valve housing 116 includes an axially extending shank portion 122 adapted to mate with filler neck 14 and a valve support fixture 124 coupled to and surrounded by axially extending shank portion 122. Valve support fixture 124 is formed to include interior region 118 and annular valve seat 120. Valve support fixture 124 of closure 110 is also formed to include an anchor flange 130 adapted to mate with latches 51, 52, 53 comprising resettable valve retainer 126 as shown, for example, in FIG. 4 to retain vacuum-relief regulator 128 in the opened position. Valve support fixture 124 is also formed to include a vent passageway 132 having, for example, an inlet at annular valve seat 120 and an outlet at annular flange 130 and through which make-up air 21 flows from atmosphere 20 into filler neck 14 upon movement of vacuum-relief regulator 128 relative to closure 110 to assume the opened position.

As shown in FIG. 3, closure 110 further includes a pressure-relief regulator 134 mounted for movement in valve housing 116 from a normally closed position against annular valve seat 120 to an opened position (not shown) away from annular valve seat 120 to vent pressurized fuel vapor in filler neck 14 through valve housing 116 to the atmosphere around filler neck cap 112. Pressure-relief regulator 134 includes a movable partition member 136 formed to include vent aperture 150 and a pressure-relief control spring 138 arranged to urge partition member 136 normally to mate with annular valve seat 120 normally to close vent passageway 132. Valve housing also includes a spring retainer 140 comprising a group of plate-retainer fingers as shown in FIG. 3. A spring retainer plate 142 is interposed between spring retainer 140 and an upper end of pressure-relief control spring 138 as shown, for example, in FIG. 3.

As shown, for example, in FIGS. 3 and 5, vacuum-relief regulator 128 includes a vacuum-relief valve member 144 arranged to mate with partition member 136 to close vent aperture 150 upon movement of vacuum-relief regulator 128 to assume the normally closed position. Vacuum-relief regulator 128 comprises an annular seat 127 arranged to mate with partition member 136 and an annular seat support plate 129 arranged to underlie and carry annular seat 127 as shown in FIG. 5. Vacuum-relief valve member 144 is arranged to lie between partition member 136 and resettable valve retainer 126 as shown, for example, in FIGS. 3-5.

Vacuum-relief regulator 128 further includes a vacuum-relief control spring 146 having an upper end engaging an underside 148 of annular seat support plate 129 of vacuum-relief valve member 144 and a lower end engaging an axially outwardly facing top side 152 of anchor flange 130. Vacuum-relief control spring 146 is arranged yieldably to urge vacuum-relief valve member 144 in an axially outward direction 154 relative to closure 110 normally to mate with partition member 136 as shown in FIGS. 3 and 5.

First latch 51 included in resettable valve retainer 126 is formed to include a retainer flange 156 shown in FIG. 5 and arranged to mate with anchor flange 130 upon movement of vacuum-relief regulator 128 to the opened position as shown in FIG. 4 to block return of vacuum-relief regulator 128 to the normally closed position shown in FIG. 5. Anchor flange 130 is annular or ring-shaped in the illustrated embodiment. In the illustrated embodiment, first latch 51 is carried on vacuum-relief valve member 144 and arranged to extend through a central passageway 158 formed in coiled vacuum-relief control spring 146. Second latch 52, third latch 53, and a fourth latch (not shown) also are formed to include retainer flanges 156 and are carried on vacuum-relief valve member 144 to extend through central passageway 158 and are circumferentially spaced apart from one another on a cylindrical base 160 included in vacuum-relief valve member 144 and coupled to annular seat support plate 129 and located at, for example, north, east, south, and west positions on a downwardly facing surface of cylindrical base 160. Base 160 is arranged to extend into an upper region of central passageway 158 formed in vacuum-relief control spring 146 as shown in FIG. 5.

In the illustrated embodiment shown in FIG. 5, valve support fixture 124 includes an axially inwardly extending sleeve 162 having an upper portion providing annular valve seat 120 and engaging partition member 136 and a lower portion carrying a radially inwardly extending anchor flange 130. Anchor flange 130 is formed to include a vent opening 164 shown in FIG. 5. Anchor flange 130 is arranged to underlie partition member 136 and cooperate with axially inwardly extending sleeve 162 to define the vent passageway 132 interconnecting vent opening 164 and vent aperture 150. In the illustrated embodiment, vacuum-relief valve member 144 and control spring 146 are contained in vent passageway 132.

Retainer flange 156 of each latch 51, 52, 53 is arranged to engage an axially inwardly facing underside 166 of anchor flange 130 upon movement of vacuum-relief regulator 128 to the opened position as shown, for example, in FIG. 4. In the illustrated embodiment, first latch 51 is made of an elastic and deformable material and is formed to include ramp means 168 for engaging anchor flange 130 during axially inward movement of vacuum-relief regulator 128 from the normally closed position toward the opened position to deform first latch 51 temporarily until retainer flange 156 included in first latch 51 has moved downwardly in axially inward direction 155 past anchor flange 130 allowing first latch 51 to move relative to vacuum-relief regulator 128 so that retainer flange 156 of first latch 51 is arranged to confront axially inwardly facing underside 166 of anchor flange 130 and therefore block return of vacuum-relief regulator 128 to the normally closed position.

First latch 51 can be released manually by a service technician from this retained or latched position shown in FIG. 4. First latch 51 is deformable to assume a first shape (shown in FIG. 4) upon mating engagement of retainer flange 156 included in first latch 51 and anchor flange 130 included in closure 110 and to assume a different deformed shape (i.e., bent or deflected) in response to a force applied manually by a service technician to move first latch 51 away from anchor flange 130 to unmate retainer flange 156 from anchor flange 130 and thus to release vacuum-relief regulator 128 so that vacuum-relief regulator 128 is free to return to the normally closed position shown in FIGS. 3 and 5. The other three latches are configured in the same manner to be released manually by a service technician so that vacuum-relief regulator 128 is free to move to its closed position. The elastic character of each latch will cause it to return to its first shape when released by the service technician.

Vacuum-relief regulator 128 is movable back and forth relative to closure 110 along a central axis 169 (shown in FIG. 5) extending through vent aperture 150 formed in closure 110 during movement between the opened and normally closed positions. First latch 51 is cantilevered to vacuum-relief regulator 128 and oriented to lie in spaced-apart parallel relation to central axis 169 upon movement of first latch 51 to assume the first shape. The retainer flange 156 included in first latch 51 is arranged to lie a first distance from central axis 169 upon movement of first latch 51 to assume the first shape. The retainer flange 156 is arranged to lie a shorter second distance from central axis 169 upon movement of first latch 51 to assume the different deformed shape. Vacuum-relief control spring 146 is arranged to urge vacuum-relief valve member 144 to move automatically relative to closure 110 in direction 154 to close vent aperture 150 upon movement of first latch 51 to the different deformed shape to unmate retainer flange 156 from anchor flange 130.

The retainer flanges 156 of first and second latches 51, 52 are arranged to lie in spaced-apart relation to one another separated by a first distance to mate with companion portions of anchor flange 130 upon movement of vacuum-relief regulator 128 to assume the opened position. The first and second latches 51, 52 are deformed and moved toward one another and relative to vacuum-relief regulator 128 in response to forces applied manually by a cap operator to unmate the retainer flanges 156 included in first and second latches 51, 52 from anchor flange 130 to release vacuum-relief regulator 128 so that it is free to return to the normally closed position to cause the retainer flanges 156 of first and second latches 51, 52 to move toward one another separated by a shorter second distance and pass through vent opening 164 defined by anchor flange 130 during movement of vacuum-relief regulator 128 from the opened position to the normally closed position.

Timely replacement of a fresh-air filter 26 included in a vehicle fuel system 10 will minimize dirt and debris that might be ingested into fuel tank 16 through a vacuum-relief system provided in a fuel tank filler neck cap 12. In accordance with the present disclosure, once opened, a vacuum-relief passage formed in a filler neck cap 12 to admit atmospheric make-up air 21 into fuel tank 16 to relieve unwanted vacuum conditions 25 in fuel tank 16 will remain open even after the vacuum in fuel tank 16 has dissipated. In accordance with the present disclosure, leak-detection system 30 included in vehicle fuel system 10 will "treat" this "opened" vacuum-relief passage in filler neck cap 12 as a "leak" and activate, for example, a vehicle dashboard maintenance indicator 32 at a suitable time. The vehicle operator upon seeing the activated indicator 32 will take the vehicle to a repair shop for maintenance. A service technician at the shop will inspect filler neck cap 12, recognize that normally closed vacuum-relief regulator 128 in the vacuum-relief passage is "opened" and understand in accordance with the present disclosure that fresh-air filter 26 should be inspected and, if dirty, replaced. Finally, the service technician will "reset" or "replace" the "opened" vacuum-relief regulator 128 that is in the vacuum-relief passage so that the vacuum-relief passage formed in filler neck cap 12 is closed once again and atmospheric air is free to flow into the fuel tank vapor space 24 through a clean fresh-air filter 26.

In the embodiment shown in FIGS. 6 and 7, a filler neck cap 212 adapted to mate with and close filler neck 14 includes a vacuum-relief regulator 228 interposed between conduits 43, 44. Vacuum-relief regulator 228 comprises an unburst vacuum-relief membrane 201 that is arranged normally to establish the closed position of vacuum-relief regulator 228. When exposed to sufficient vacuum via filler neck 14 and conduit 44 caused by vacuum conditions 25 in fuel tank vapor space 24, vacuum-relief membrane 201 will burst to provide an opening linking conduits 43, 44 in fluid communication with one another to allow flow of make-up air 21 therebetween, thus to establish the opened position of vacuum-relief regulator 228.

Vacuum-relief regulator 228 is not resettable manually. Instead, once vacuum-relief membrane 201 has burst, a new vacuum-relief regulator with an unburst vacuum-relief membrane must be installed by a service technician.

The invention claimed is:

1. A cap for a filler neck of a fuel tank, the cap comprising a closure adapted to mate with a filler neck to close a mouth opening into the filler neck, the closure being formed to include a vent aperture opened to the atmosphere surrounding the closure, a vacuum-relief regulator mounted for movement relative to the closure from a normally closed position blocking flow of atmosphere through the vent aperture to an opened position allowing flow of atmosphere through the vent aperture into the filler neck when the closure is mated with the filler neck and pressure in the filler neck drops below a predetermined subatmospheric level, retainer means for retaining the vacuum-relief regulator in the opened position after the vacuum-relief regulator has moved from the normally closed position to assume the opened position so that atmosphere and fuel vapor can continue to flow through the vent aperture formed in the closure even after pressure extant in the filler neck rises above the predetermined subatmospheric level, wherein the closure includes an anchor flange and the retainer means includes a first latch coupled to the vacuum-relief regulator and formed to include a retainer flange arranged to mate with the anchor flange upon movement of the vacuum-relief regulator to the opened position to block return of the vacuum-relief regulator to the normally closed position, and wherein the closure includes a partition member formed to include the vent aperture and the vacuum-relief regulator includes a vacuum-relief valve member arranged to carry the first latch and to mate with the partition member to close the vent aperture upon movement of the vacuum-relief regulator to assume the normally closed position and a coiled vacuum-relief control spring arranged to urge the vacuum-relief valve member to mate with the partition member and formed to include a central passageway receiving the first latch therein.

2. The cap of claim 1, wherein the closure further includes an axially inwardly extending sleeve having an upper portion engaging the partition member and a lower portion carrying the anchor flange, the anchor flange is formed to include a vent opening and is arranged to underlie the partition member and cooperate with the axially inwardly extending sleeve to define a vent passageway interconnecting the vent opening and the vent aperture and containing the vacuum-relief valve member and the coiled vacuum-relief control spring therein.

3. The cap of claim 1, wherein the coiled vacuum-relief control spring includes an upper end engaging an underside of the vacuum-relief valve member and a lower end engaging an axially outwardly facing top side of the anchor flange and the retainer flange of the first latch is arranged to engage an axially inwardly facing underside of the anchor flange upon movement of the vacuum-relief regulator to the opened position.

4. The cap of claim 1, wherein the retainer means further includes a second latch coupled to the vacuum-relief valve member and arranged to extend though the central passageway formed in the coiled vacuum-relief control spring and the second latch is formed to include a retainer flange to mate with the anchor flange upon movement of the vacuum-relief regulator to the opened position to cooperate with the first latch to block return of the vacuum-relief regulator to the normally closed position.

5. The cap of claim 1, wherein the first latch is made of an elastic material and is formed to include ramp means for engaging the anchor flange during axially inward movement of the vacuum-relief regulator from the normally closed position toward the opened position to deform the first latch temporarily until the retainer flange included in the first latch has moved past the anchor flange allowing the first latch to move relative to the vacuum-relief regulator so that the retainer flange of the first latch is arranged to confront an axially inwardly facing underside of the anchor flange and therefore block return of the vacuum-relief regulator to the normally closed position.

6. The cap of claim 1, wherein the first latch is made of a deformable material and the first latch is deformable to assume a first shape upon mating engagement of the retainer flange included in the first latch and the anchor flange included in the closure and to assume a different deformed shape in response to a force applied manually by a cap operator to move the first latch away from the anchor flange to unmate the retainer flange from the anchor flange to release the vacuum-relief regulator so that the vacuum-relief regulator is free to return to the normally closed position.

7. The cap of claim 6, wherein the vacuum-relief regulator is movable back and forth relative to the closure along a central axis extending through the vent aperture formed in the closure during movement between the opened and normally closed positions, the first latch is cantilevered to the vacuum-relief regulator and oriented to lie in spaced-apart parallel relation to the central axis upon movement of the first latch to assume the first shape, the retainer flange included in the first latch is arranged to lie a first distance from the central axis upon movement of the first latch to assume the first shape, and the retainer flange is arranged to lie a shorter second distance from the central axis upon movement of the first latch to assume the different deformed shape.

8. The cap of claim 1, wherein the retainer means includes a second latch coupled to the vacuum-relief regulator and formed to include a retainer flange arranged to mate with the anchor flange upon movement of the vacuum-relief regulator to the opened position to block return of the vacuum-relief regulator to the closed position.

9. The cap of claim 8, wherein the anchor flange is formed to include a vent opening located in fluid communication with the vent aperture formed in the closure, each of the first and second latches is made of an elastic material to allow the first and second latches to be yieldably deformed during movement of the vacuum-relief regulator between the opened and normally closed positions, the retainer flanges of the first and second latches are arranged to lie in spaced-apart relation to one another separated by a first distance to mate with companion portions of the anchor flange upon movement of the vacuum-relief regulator to assume the opened position, and the first and second latches are deformed and moved toward one another and relative to the vacuum-relief regulator in response to forces applied manually by a cap operator to unmate the retainer flanges included in the first and second latches from the anchor flange to release the vacuum-relief regulator so that it is free to return to the normally closed position to cause the retainer flanges of the first and second latches to move toward one another separated by a shorter second distance and pass through the vent opening defined by the anchor flange during movement of the vacuum-relief regulator from the opened position to the normally closed position.

10. A cap for a filler neck of a fuel tank, the cap comprising
a closure adapted to mate with a filler neck to close a mouth opening into the filler neck, the closure being formed to include a vent aperture opened to the atmosphere surrounding the closure,
a vacuum-relief regulator mounted for movement relative to the closure from a normally closed position blocking flow of atmosphere through the vent aperture to an opened position allowing flow of atmosphere through the vent aperture into the filler neck when the closure is mated with the filler neck and pressure in the filler neck drops below a predetermined subatmospheric level,
retainer means for retaining the vacuum-relief regulator in the opened position after the vacuum-relief regulator has moved from the normally closed position to assume the opened position so that atmosphere and fuel vapor can continue to flow through the vent aperture formed in the closure even after pressure extant in the filler neck rises above the predetermined subatmospheric level,
wherein the closure includes an anchor flange and the retainer means includes a first latch coupled to the vacuum-relief regulator and formed to include a retainer flange arranged to mate with the anchor flange upon movement of the vacuum-relief regulator to the opened position to block return of the vacuum-relief regulator to the normally closed position,
wherein the first latch is made of a deformable material and the first latch is deformable to assume a first shape upon mating engagement of the retainer flange included in the first latch and the anchor flange included in the closure and to assume a different deformed shape in response to a force applied manually by a cap operator to move the first latch away from the anchor flange to unmate the retainer flange from the anchor flange to release the vacuum-relief regulator so that the vacuum-relief regulator is free to return to the normally closed position, and
wherein the vacuum-relief regulator includes a vacuum-relief valve member arranged to carry the first latch and to close the vent aperture upon movement of the vacuum-relief regulator to assume the normally closed position and a vacuum-relief control spring arranged to urge the vacuum-relief valve member to move automatically relative to the closure to close the vent aperture upon movement of the first latch to the different deformed shape to unmate the retainer flange from the anchor flange.

11. The cap of claim 10, wherein the vacuum-relief control spring includes an upper end engaging the underside of the vacuum-relief valve member and a lower end engaging an axially outwardly facing top side of the anchor flange and the retainer flange of the first latch is arranged to engage an axially inwardly facing underside of the anchor flange upon movement of the vacuum-relief regulator to the opened position.

12. A cap for a filler neck of a fuel tank, the cap comprising
a closure adapted to mate with a filler neck to close a mouth opening into the filler neck the closure being formed to include a vent aperture opened to the atmosphere surrounding the closure,
a vacuum-relief regulator mounted for movement relative to the closure from a normally closed position blocking flow of atmosphere through the vent aperture to an opened position allowing flow of atmosphere through the vent aperture into the filler neck when the closure is mated with the filler neck and pressure in the filler neck drops below a predetermined subatmospheric level,
retainer means for retaining the vacuum-relief regulator in the opened. position after the vacuum-relief regulator has moved from the normally closed position to assume the opened position so that atmosphere and fuel vapor can continue to flow through the vent aperture formed in the closure even after pressure extant in the filler neck rises above the predetermined subatmospheric level,
wherein the closure includes an anchor flange and the retainer means includes a first latch coupled to the vacuum-relief regulator and formed to include a retainer flange arranged to mate with the anchor flange upon movement of the vacuum-relief regulator to the opened position to block return of the vacuum-relief regulator to the normally closed position,
wherein the retainer means includes a second latch coupled to the vacuum-relief regulator and formed to include a retainer flange arranged to mate with the anchor flange upon movement of the vacuum-relief regulator to the opened position to block return of the vacuum-relief regulator to the closed position,
wherein the anchor flange is formed to include a vent opening located in fluid communication with the vent aperture formed in the closure, each of the first and second latches is made of an elastic material to allow the first and second latches to be yieldably deformed during movement of the vacuum-relief regulator between the opened and normally closed positions, the retainer flanges of the first and second latches are arranged to lie in spaced-apart relation to one another separated by a first distance to mate with companion portions of the anchor flange upon movement of the vacuum-relief regulator to assume the opened position, and the first and second latches are deformed and moved toward one another and relative to the vacuum-relief regulator in response to forces applied manually by a cap operator to unmate the retainer flanges included in the first and second latches from the anchor flange to release the vacuum-relief regulator so that it is free to return to the normally closed position to cause the retainer flanges of the first and second latches to move toward one another separated by a shorter second distance and pass through the vent opening defined by the anchor flange during movement of the vacuum-relief regulator from the opened position to the normally closed position, and wherein the vacuum-relief regulator includes a vacuum-relief valve member arranged to carry the first and second latches and to close the vent aperture upon movement of the vacuum-relief regulator to assume the normally closed position and a vacuum-relief control spring arranged to urge the vacuum-relief valve member to move automatically relative to the closure to close the vent aperture upon movement of the first and second latches toward one another and relative to the vacuum-relief regulator to cause the first and second retainer flanges to be separated by the shorter second distance to allow the first and second retainer flanges to pass through the vent opening defined by the anchor flange.

13. A cap for a filler neck of a fuel tank, the cap comprising a closure adapted to mate with a filler neck to close a mouth opening into the filler neck, the closure being formed to include a vent aperture opened to the atmosphere surrounding the closure, a vacuum-relief regulator mounted for movement relative to the closure from a normally closed position blocking flow of atmosphere through the vent aperture to an opened position allowing flow of atmosphere through the vent aperture into the filler neck when the closure is mated with the filler neck and pressure in the filler neck drops below a predetermined subatmospheric level, retainer means for retaining the vacuum-relief regulator in the opened position after the vacuum-relief regulator has moved from the normally closed position to assume the opened position so that atmosphere and fuel vapor can continue to flow through the vent aperture formed in the closure even after pressure extant in the filler neck rises above the predetermined subatmospheric level, and wherein the closure includes a valve housing formed to include an interior region containing the vacuum-relief regulator and an annular valve seat defining a vent passageway, the closure further includes a pressure-relief regulator including a movable partition member formed to include the vent aperture and a pressure-relief control spring arranged to urge the partition member normally to mate with the annular valve seat normally to close the vent passageway, the vacuum-relief regulator includes a vacuum-relief valve member arranged to mate with the partition member to close the vent aperture upon movement of the vacuum-relief regulator to assume the normally closed position, and the vacuum-relief valve member is arranged to lie between the partition member and the retainer means.

14. The cap of claim 13, wherein the valve housing further includes an anchor flange and the retainer means includes a first latch coupled to the vacuum-relief valve member to move therewith and formed to include a retainer flange arranged to mate with the anchor flange upon movement of the vacuum-relief regulator to the opened position to block return of the vacuum-relief regulator to the normally closed position.

15. The cap of claim 14, wherein the valve housing includes an axially extending shank portion adapted to mate with the filler neck and a valve support fixture coupled to and surrounded by the axially extending shank portion and formed to define the interior region, and the valve support fixture includes an axially inwardly extending sleeve having an upper portion configured to define the annular valve seat and a lower portion configured to carry the anchor flange.

16. The cap of claim 14, wherein the vacuum-relief regulator further includes a vacuum-relief control spring having an upper end engaging the underside of the vacuum-relief valve member and a lower end engaging an axially outwardly facing top side of the anchor flange and the vacuum-relief control spring is arranged yieldably to urge the vacuum-relief valve member in an axially outward direction to mate with the partition member.

17. The cap of claim 14, wherein the vacuum-relief regulator further includes spring means for yieldably urging the vacuum-relief valve member to move in an axially outward direction toward the partition member in response to unmating of the retainer flange and the anchor flange so that the vacuum-relief regulator is returned to the normally closed position.

18. A cap for a filler neck of a fuel tank, the cap comprising a closure adapted to mote with a filler neck to close a mouth opening into the filler neck, the closure being formed to include a vent aperture opened to the atmosphere surrounding the closure, a vacuum-relief valve member, a vacuum-relief control spring arranged yieldably to urge the vacuum-relief valve member from an opened position allowing flow of atmosphere through the vent aperture into the filler neck when the closure is mated with the filler neck and pressure in the filler neck drops below a predetermined subatmospheric level to a normally closed position blocking flow of atmosphere through the vent aperture, a first latch coupled to the vacuum-relief value member to move therewith relative to the closure, the first latch including a retainer flange arranged to mate with the closure upon movement of the vacuum-relief valve member against the vacuum-relief control spring to the opened position to block return of the vacuum-relief valve member to the closed position, wherein the first latch is made of an elastic material and is arranged to assume a first shape upon movement of the vacuum-relief valve to the opened position and mating engagement of the retainer flange on the first latch with the closure and the first latch is deformed to assume a different second shape in response to a force applied manually by a cap operator to move the first latch relative to the closure to unmate the retainer flange of the first latch and the closure so that the vacuum-relief valve member is released and free to return under an urging force applied by the vacuum-relief control spring to the normally closed positions, wherein the closure includes a partition member formed to include the vent aperture, the vacuum-relief valve member is arranged to mate with the partition member to close the vent aperture upon movement of the vacuum-relief valve member to assume the normally closed position, and the vacuum-relief control spring is arranged to urge the vacuum-relief valve member to mate with the partition member and formed to include a central passageway receiving the first latch therein, and wherein the closure further includes an axially inwardly extending sleeve having an upper portion engaging the partition member and a lower portion carrying an anchor flange, the anchor flange is formed to include a vent opening and is arranged to underlie the partition member and cooperate with the axially inwardly extending sleeve to define a vent passageway interconnecting the vent opening and the vent aperture and containing the vacuum-relief valve member and the vacuum-relief control spring therein.

19. The cap of claim 18, wherein the closure further includes an anchor flange, the vacuum-relief control spring includes an upper end engaging an underside of the vacuum-relief valve member and a lower end engaging an axially outwardly facing top side of the anchor flange, and the retainer flange of the first latch is arranged to engage an axially inwardly facing underside of the anchor flange upon movement of the vacuum-relief valve member to the opened position.

20. The cap of claim 18, further comprising a second latch coupled to the vacuum-relief valve member and arranged to extend through the central passageway formed in the vacuum-relief control spring and the second latch is formed to include a retainer flange to mate with the closure upon movement of the vacuum-relief valve member to the opened position to cooperate with the first latch to block return of the vacuum-relief valve member to the normally closed position.

21. The cap of claim 18, wherein the closure further includes an anchor flange and the first latch is made of an elastic material and is formed to include ramp means for engaging the anchor flange during axially inward movement of the vacuum-relief valve member from the normally closed position toward the opened position to deform the first latch temporarily until the retainer flange included in the first latch has moved past the anchor flange allowing the first latch to move relative to the vacuum-relief valve member so that the retainer flange of the first latch is arranged to confront an axially inwardly facing underside of the anchor flange and therefore block return of the vacuum-relief valve member to the normally closed position.

22. The cap of claim 18, wherein the closure further includes an anchor flange, the vacuum-relief control spring includes an upper end engaging an underside of the vacuum-relief valve member and a lower end engaging an axially outwardly facing top side of the anchor flange, and the retainer flange of the first latch is arranged to engage an axially inwardly facing underside of the anchor flange upon movement of the vacuum-relief valve member to the opened position.

23. The cap of claim 18, wherein the closure further includes an anchor flange, and further comprising a second latch coupled to the vacuum-relief valve member to move therewith and formed to include a retainer flange arranged to mate with the anchor flange upon movement of the vacuum-relief valve member to the opened position to block return of the vacuum-relief valve member to the normally closed position.

24. The cap of claim 23, wherein the anchor flange is formed to include a vent opening located in fluid communication with the vent aperture formed in the closure, each of the first and second latches is made of an elastic material to allow the first and second latches to be yieldably deformed during movement of the vacuum-relief valve member between the opened and normally closed positions, the retainer flanges of the first and second latches are arranged to lie in spaced-apart relation to one another separated by a first distance to mate with companion portions of the anchor flange upon movement of the vacuum-relief valve member to assume the opened position, and the first and second latches are deformed and moved toward one another and relative to the vacuum-relief valve member in response to forces applied manually by a cap operator to unmated the retainer flanges included in the first and second latches from the anchor flange to release the vacuum-relief valve member so that it is free to return to the normally closed position to cause the first and second retainer flanges to move toward one another separated by a shorter second distance and pass through the vent opening defined by the anchor flange during movement of the vacuum-relief valve member from the opened position to the normally closed position.

25. A cap for a filler neck of a fuel tank, the cap comprising
a closure adapted to mate with a filler neck to close a mouth opening into the filler neck, the closure being funned to include a vent aperture opened to the atmosphere surrounding the closure,
a vacuum-relief valve member,
a vacuum-relief control spring arranged yieldably to urge the vacuum-relief valve member from an opened position allowing flow of atmosphere through the vent aperture into the filler neck when the closure is mated with the filler neck and pressure in the filler neck drops below a predetermined subatmospheric level to a normally closed position blocking flow of atmosphere through the vent aperture,
a first latch coupled to the vacuum-relief valve member to move therewith relative to the closure, the first latch including a retainer flange arranged to mate with the closure upon movement of the vacuum-relief valve member against the vacuum-relief control spring to the opened position to block return of the vacuum-relief valve member to the closed position, and
wherein the closure includes a valve housing formed to include an interior region containing the vacuum-relief valve member and an annular valve seat defining a vent passageway, the closure further includes a pressure-relief regulator including a movable partition member formed to include the vent aperture and a pressure-relief control spring arranged to urge the partition member normally to mate with the annular valve seat normally to close the vent passageway, the vacuum-relief valve member is arranged to mate with the partition member to close the vent aperture upon movement of the vacuum-relief valve member to assume the normally closed position, and the vacuum-relief valve member is arranged to lie between the partition member and the retainer flange of the first latch.

26. A cap for a filler neck of a fuel tank, the cap comprising
a closure adapted to mate with a filler neck to close a mouth opening into the filler neck, the closure being formed to include a vent aperture opened to the atmosphere surrounding the closure,
a vacuum-relief valve member,
a vacuum-relief control spring arranged yieldably to urge the vacuum-relief valve member from an opened position allowing flow of atmosphere through the vent aperture into the filler neck when the closure is mated with the filler neck and pressure in the filler neck drops below a predetermined subatmospheric level to a normally closed position blocking flow of atmosphere through the vent aperture, a first latch coupled to the vacuum-relief valve member to move therewith relative to the closure, the first latch including a retainer flange arranged to mate with the closure upon movement of the vacuum-relief valve member against the vacuum-relief control spring to the opened position to block return of the vacuum-relief valve member to the closed position, and wherein the valve housing includes an anchor flange, an axially extending shank portion adapted to mate with the filler neck, and a valve support fixture coupled to and surrounded by the axially extending shank portion and formed to define the interior region, the valve support fixture includes an axially inwardly extending sleeve having an upper portion configured to define the annular valve seat and a lower portion configured to carry the anchor flange, and the retainer flange of the first latch is arranged to mate with the anchor flange upon movement of the vacuum-relief valve member to the opened position to block return of the vacuum-relief valve member to the normally closed position.

* * * * *